(12) United States Patent
Zheng et al.

(10) Patent No.: US 12,312,257 B2
(45) Date of Patent: May 27, 2025

(54) ULTRAVIOLET STERILIZATION DEVICE

(71) Applicant: Ma'anshan Jason Semiconductor Co., Ltd, Ma'anshan (CN)

(72) Inventors: Yuanzhi Zheng, Ma'anshan (CN); Yu Yao, Ma'anshan (CN); Jiewei Zhou, Ma'anshan (CN); Minglan Zheng, Ma'anshan (CN); Kang Yang, Ma'anshan (CN)

(73) Assignee: Ma'anshan Jason Semiconductor Co., Ltd., Ma'anshan (CN)

( * ) Notice: Subject to any disclaimer, the term of this patent is extended or adjusted under 35 U.S.C. 154(b) by 344 days.

(21) Appl. No.: 17/690,582

(22) Filed: Mar. 9, 2022

(65) Prior Publication Data

US 2023/0079118 A1  Mar. 16, 2023

(30) Foreign Application Priority Data

Sep. 13, 2021 (CN) .......................... 202111071127.9

(51) Int. Cl.
*C02F 1/32* (2023.01)

(52) U.S. Cl.
CPC ........ *C02F 1/325* (2013.01); *C02F 2201/004* (2013.01); *C02F 2201/3222* (2013.01); *C02F 2201/3227* (2013.01); *C02F 2201/3228* (2013.01); *C02F 2303/04* (2013.01); *C02F 2307/06* (2013.01); *C02F 2307/12* (2013.01)

(58) Field of Classification Search
CPC ............... C02F 1/325; C02F 2201/004; C02F 2201/3222; C02F 2201/3227; C02F 2201/3228; C02F 2303/04; C02F 2307/04; C02F 2307/06; C02F 2307/12
See application file for complete search history.

(56) References Cited

U.S. PATENT DOCUMENTS

| | | | | |
|---|---|---|---|---|
| 7,270,748 | B1* | 9/2007 | Lieggi .................... | C02F 1/325 250/435 |
| 10,099,944 | B2* | 10/2018 | Smetona ................... | A61L 2/10 |
| 10,736,980 | B2* | 8/2020 | Mochizuki .............. | C02F 1/325 |
| 2006/0186059 | A1* | 8/2006 | Saccomanno ............. | A61L 9/20 210/748.11 |
| 2008/0164422 | A1* | 7/2008 | Kim ....................... | A61L 2/0088 250/429 |
| 2009/0208386 | A1* | 8/2009 | Barsky ..................... | C02F 1/32 422/186.3 |

(Continued)

*Primary Examiner* — Sean M Luck
(74) *Attorney, Agent, or Firm* — McHale & Slavin, P.A.

(57) ABSTRACT

An ultraviolet sterilization device includes a liquid passing pipe assembly and an ultraviolet light source. The liquid passing pipe assembly includes a shell and a transparent hollow pipe, the shell is sleeved on the hollow pipe, the shell is provided with an accommodating groove. The ultraviolet light source is provided in the accommodating groove. An end of the hollow pipe is configured as a liquid inlet end, and another end thereof is configured as a liquid outlet end, and the hollow pipe is used for circulating liquid. The wall surface of the hollow pipe is covered with a reflective film, the reflective film is provided with first light transmitting holes at the position corresponding to the ultraviolet light source. The first light transmitting hole is communicated with the accommodating groove, and the reflective film is used for scattering the ultraviolet light in different areas in the hollow pipe.

12 Claims, 10 Drawing Sheets

(56) References Cited

U.S. PATENT DOCUMENTS

| | | | |
|---|---|---|---|
| 2012/0051977 A1* | 3/2012 | Boodaghians | C02F 1/325 422/186.3 |
| 2013/0146783 A1* | 6/2013 | Boodaghians | C02F 1/325 250/435 |
| 2013/0236353 A1* | 9/2013 | Blechschmidt | C02F 1/325 422/4 |
| 2014/0202962 A1* | 7/2014 | Bilenko | C02F 1/325 210/748.11 |
| 2015/0008167 A1* | 1/2015 | Shturm | G01N 21/33 210/85 |
| 2015/0060693 A1* | 3/2015 | Lee | A61L 2/10 250/435 |
| 2016/0052802 A1* | 2/2016 | Ochi | C02F 1/325 250/435 |
| 2016/0137528 A1* | 5/2016 | Wipprich | C02F 1/325 250/492.1 |
| 2017/0100494 A1* | 4/2017 | Dobrinsky | A23C 3/076 |
| 2017/0281812 A1* | 10/2017 | Dobrinsky | B67D 1/07 |
| 2019/0314533 A1* | 10/2019 | Ahn | A61L 2/26 |

* cited by examiner

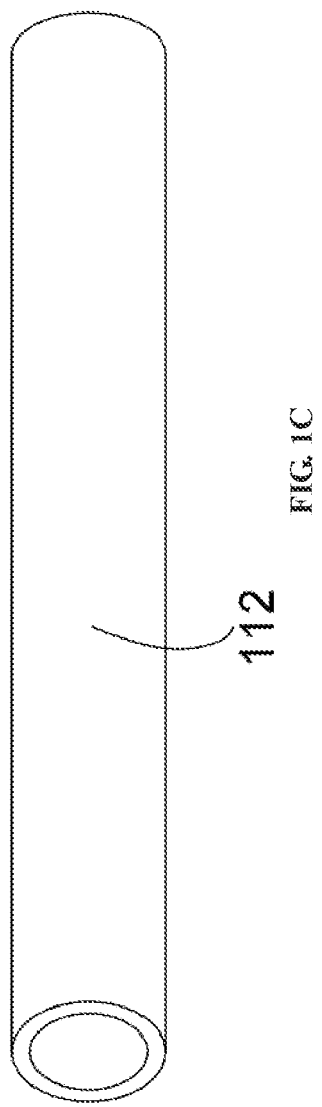

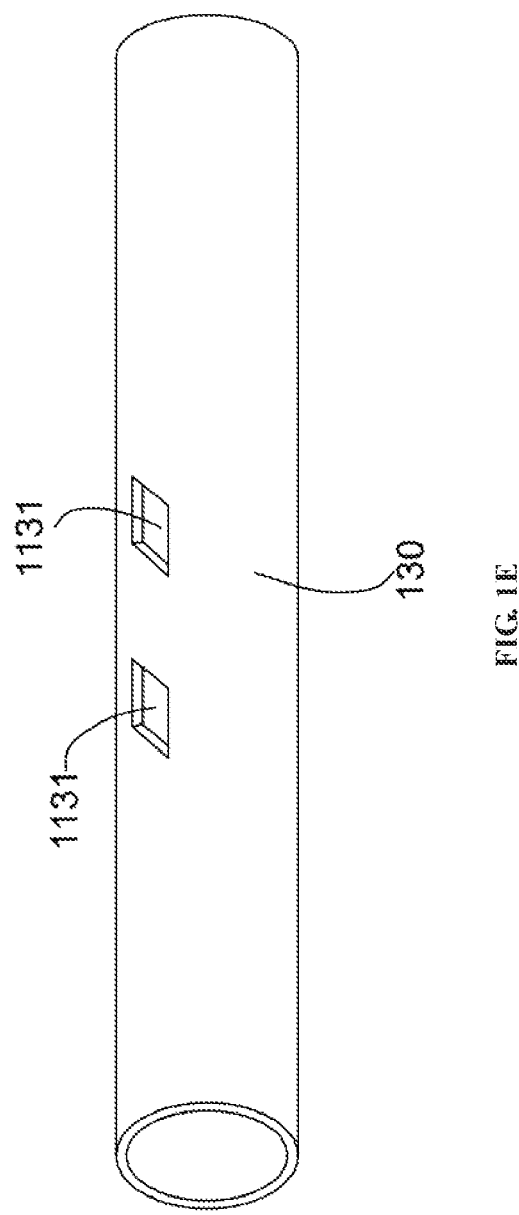

ULTRAVIOLET STERILIZATION DEVICE

CROSS REFERENCE TO RELATED APPLICATION

This patent application claims the benefit of and priority to Chinese Patent Application No. 202111071127.9 filed on Sep. 13, 2021, the disclosure of which is incorporated by reference herein in its entirety as part of the present application.

TECHNICAL HELD

The present disclosure relates to the technical field of light sterilization, in particular to an ultraviolet sterilization device.

BACKGROUND ART

Because ultraviolet rays can effectively inactivate bacteria and viruses, it has become a common sterilization method. In recent years, ultraviolet Light Emitting Diodes (LEDs) based on AlGaN materials have developed rapidly. Compared with traditional mercury lamps, ultraviolet LEI) lamps have many advantages, such as small size, no mercury, fast response speed, low-voltage light source and so on, so that ultraviolet LED lamps are widely used in the fields of surface sterilization, liquid sterilization, air sterilization and so on.

One of the existing devices for ultraviolet sterilization of liquid is provided with a liquid storage tank, and the liquid in the liquid storage tank is sterilized by long-term ultraviolet irradiation. The sterilization device can achieve the sterilization rate of 99.9%, and the sterilization device is cheap and relatively mature in technology. However, under the long-term ultraviolet irradiation, the above ultraviolet sterilization device will cause yellowing of the plastic of the tank body of the liquid storage tank and even result in powdering in severe cases. Therefore, in the prior art, a flow-through sterilization device is proposed. When the liquid flows through the sterilization cavity, it can achieve 99.9% of sterilization at a flow rate of several liters/minute.

However, in order to achieve the sterilization ability, the above flow-through sterilization devices generally use ultraviolet LED light sources with higher ultraviolet power. At the same time, the flow-through sterilization device needs to be designed with a more complex heat dissipation structure and a liquid flow structure, which is large in volume and high in cost, and brings difficulties to large-scale popularization.

SUMMARY

The embodiment of the present disclosure provides an ultraviolet sterilization device, which is simple in structure, low in cost, and suitable for popularization and use in scenes such as household water dispensers, faucets, pet water dispensers, humidifiers, smart toilets and the like.

An ultraviolet sterilization device provided by the present disclosure includes a liquid passing pipe assembly and an ultraviolet light source. The liquid passing pipe assembly includes a shell and a transparent hollow pipe, the shell is sleeved on the hollow pipe and provided with an accommodating groove, and the ultraviolet light source is provided in the accommodating groove; an end of the hollow pipe is configured as a liquid inlet end, and another end thereof is configured as a liquid outlet end, and the hollow pipe is used for circulating liquid. A wall surface of the hollow pipe is covered with a reflective film, the reflective film is provided with first light transmitting holes at a position corresponding to the ultraviolet light source, the first light transmitting holes are communicated with the accommodating groove, so that ultraviolet light emitted by the ultraviolet light source is incident into the hollow pipe and sterilizes the liquid circulating in the hollow pipe, and the reflective film is used for scattering the ultraviolet light in different areas in the hollow pipe.

As an alternative embodiment, the ultraviolet light source includes two groups of ultraviolet light sources, and the two groups of ultraviolet light sources are provided on side walls of opposite sides of the shell, respectively.

As an alternative embodiment, the ultraviolet light source comprises LED lamps, and a number of the LED lamps in each group of ultraviolet light sources is less than or equal to two.

As an alternative embodiment, the LED lamps are correspondingly provided in a middle of the hollow pipe.

As an alternative embodiment, a radial size of each LED lamp is less than or equal to 5 mm.

As an alternative embodiment, a radial size of each first light transmitting hole is greater than or equal to one time a size of the LED lamp in the radial direction and less than or equal to three times the size of the LED lamp in the radial direction.

As an alternative embodiment, a wavelength range of ultraviolet light emitted by the LED lamp is 240-340 nm.

As an alternative embodiment, the reflective film is made of any one of inorganic material coating with diffuse reflectivity higher than 95%, fluorine-based organic material film with diffuse reflectivity higher than 95% or reflective medium film with specular reflectivity higher than 98%.

As an alternative embodiment, the reflective film is provided on an outer wall surface of the hollow pipe.

As an alternative embodiment, a length of the hollow pipe ranges from 40 mm to 100 mm.

As an alternative embodiment, an inner diameter of the hollow pipe ranges from 4 mm to 20 mm.

As an alternative embodiment, the hollow pipe is made of any one of quartz, alumina or fluorine-based organic ultraviolet transparent material.

As an alternative embodiment, a light emitting angle of the LED lamp is less than or equal to 140 degrees.

As an alternative embodiment, the accommodating groove is provided on an outer wall surface of the shell, an opening of the accommodating groove is away from the hollow pipe, a bottom of the accommodating groove is provided with second light transmitting holes at positions corresponding to the first light transmitting holes, and the second light transmitting holes are communicated with the first light transmitting holes, so that ultraviolet light emitted by the ultraviolet light source is incident into the hollow pipe after passing through the second light transmitting holes and the first light transmitting holes.

As an alternative embodiment, an upper cover is provided at the opening of the accommodating groove, and the upper cover is used for protecting the ultraviolet light source.

As an alternative embodiment, the accommodating groove is provided on an inner wall surface of the shell, an opening of the accommodating groove faces the hollow pipe, and ultraviolet light emitted by the ultraviolet light source is incident into the hollow pipe through the first light transmitting holes.

As an alternative embodiment, the liquid inlet end of the hollow pipe is provided with a detachable joint, an end of the joint is provided with an external thread, an end of the shell corresponding to the liquid inlet end is provided with an internal thread, and the end of the joint is screwed and fixed to the shell.

As an alternative embodiment, the shell is made of heat shrinkable material.

The ultraviolet sterilization device provided by the present disclosure includes the liquid passing pipe assembly and the ultraviolet light source. The liquid passing pipe assembly includes the shell and the transparent hollow pipe, the shell is sleeved on the hollow pipe and provided with an accommodating groove; the ultraviolet light source is provided in the accommodating groove; one end of the hollow pipe is provided as a liquid inlet end, and the other end thereof is provided as a liquid outlet end, and the hollow pipe is used for circulating liquid. The wall surface of the hollow pipe is covered with a reflective film, the reflective film is provided with the first light transmitting holes at the position corresponding to the ultraviolet light source, the first light transmitting holes are communicated with the accommodating groove, so that the ultraviolet light emitted by the ultraviolet light source is incident into the hollow pipe and sterilizes the liquid circulating in the hollow pipe. The reflective film is used for scattering the ultraviolet light in different areas in the hollow pipe. The ultraviolet sterilization device provided by the present disclosure is simple in structure, low in cost, and suitable for popularization and use in scenes such as household water dispensers, faucets, pet water dispensers, humidifiers, smart toilets and the like.

BRIEF DESCRIPTION OF THE DRAWINGS

In order to more clearly explain the embodiments of the present disclosure or the technical solutions in the prior art, the drawings that need to be used in the description of the embodiments or the prior art will be briefly introduced hereinafter. The drawings in the following description are illustrative embodiments of the present disclosure. For those skilled in the art, other drawings can be obtained according to these drawings without paying creative efforts.

FIG. 1C is a schematic structural diagram of a hollow pipe of an ultraviolet sterilization device according to an embodiment of the present disclosure.

FIG. 1E is a schematic structural diagram of a shell of an ultraviolet sterilization device according to an embodiment of the present disclosure.

LIST OF REFERENCE NUMBERS

Figure 1A:
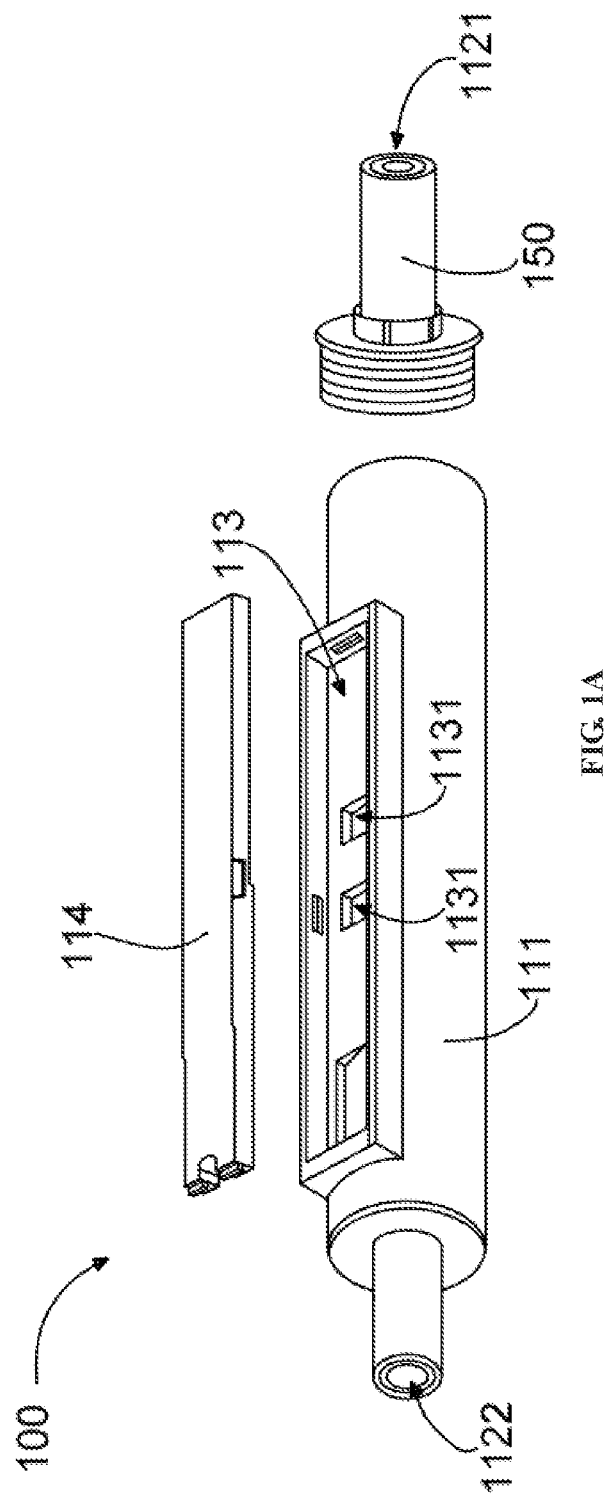
FIG. 1A is an exploded view of an ultraviolet sterilization device according to an embodiment of the present disclosure.

100—ultraviolet sterilization device; 110—liquid passing pipe assembly; 111—shell; 1112—outer wall surface; 1114—inner wall surface; 112—hollow pipe; 1121—liquid inlet end; 1122—liquid outlet end; 113—accommodating groove; 114—upper cover; 1131—second light transmitting hole; 130—reflective film; 131—first light transmitting hole; 140—ultraviolet light source; 141—LED lamp; 142—substrate; 150—joint.

DETAILED DESCRIPTION OF THE EMBODIMENTS

In order to make the purpose, technical solution and advantages of the embodiment of the present disclosure clearer, the technical solution in the embodiment of the present disclosure will be clearly and completely described with reference to the drawings in the embodiment of the present disclosure hereinafter. Apparently, the described embodiments are a part of the embodiments of the present disclosure, rather than all of the embodiments.

First of all, those skilled in the art should understand that these embodiments are only used to explain the technical principle of the present disclosure, rather than limit the scope of protection of the present disclosure. Those skilled in the art can adjust the embodiments as required to adapt to the specific application.

Secondly, it should be noted that in the description of the present disclosure, the direction or positional relationship indicated by the terms such as "inside" and "outside" are based on the direction or positional relationship shown in the drawings, which is only for convenience of description, rather than indicate or imply that the device or component must have a specific orientation, be constructed and operated in a specific orientation, so that it cannot be understood as a limitation of the present disclosure.

In addition, it should be noted that in the description of the present disclosure, unless otherwise specified and limited, the terms "linked" and "connected" should be understood broadly. For example, they can be fixedly connected, detachably connected or integrally connected; they can be mechanically connected or electrically connected; they can be the internal communication between two components. For those skilled in the art, the specific meanings of the above terms in the present disclosure can be understood according to specific situations.

It should be noted that in the present disclosure, unless otherwise specified and limited, the first feature is "above" or "below" the second feature, indicating that the first and second features are in direct contact with each other, or the first and second features are in indirect contact with each other through an intermediate medium. Furthermore, the first feature is "on", "above" and "over" the second feature, which may indicate that the first feature is directly above or obliquely above the second feature, or simply indicate that the liquid level of the first feature is higher than that of the second feature. The first feature is "under", "below" and "underneath" the second feature, which may indicate that the first feature is directly below or obliquely below the second feature, or simply indicate that the liquid level of the first feature is less than that of the second feature. The terms such as "above" and "below" are used to describe the relative position relationship of each structure in the drawings, which is used only for convenience and clarity of description, rather than limit the implementable scope of the present disclosure. The change or adjustment of the relative relationship should be also regarded as the implementable scope of the present disclosure without substantial technical changes.

In the description of this specification, referring to the description of the terms "one embodiment". "some embodiments", "exemplary embodiments", "examples", "specific examples" or "some examples" means that the specific features, structures, materials or characteristics described in connection with this embodiment or example are included in at least one embodiment or example of the present disclosure. In this specification, the schematic expressions of the above terms do not necessarily refer to the same embodiments or examples. Furthermore, the specific features, structures, materials or characteristics described may be combined in any one or more embodiments or examples in a suitable manner.

Because ultraviolet rays can inactivate bacteria and viruses, ultraviolet sterilization has become a common sterilization method. There are mainly two types of existing liquid sterilization devices. One liquid sterilization device is provided with a liquid storage tank to sterilize the liquid in the liquid storage tank by using ultraviolet rays, but this method easily causes yellowing of the tank body of the liquid storage tank. Based on this problem, the prior art also proposes a flow-through sterilization device, which sterilizes the liquid by external irradiation of the sterilization cavity when the liquid flows through the sterilization cavity. However, the existing flow-through sterilization devices generally use light sources with high ultraviolet power, and are correspondingly provided with a complex heat dissipation structure and a liquid flow structure, which are bulky and costly, and are not conducive to large-scale popularization and application.

In view of the above problems, the present disclosure provides an ultraviolet sterilization device, which mainly includes a liquid-passing pipe assembly and an ultraviolet light source. The ultraviolet light source can sterilize the liquid flowing into the liquid passing pipe assembly. The ultraviolet sterilization device provided by the present disclosure is simple in structure and low in cost, and can be widely used in scenes such as household water dispensers, faucets, pet water dispensers, humidifiers, smart toilets and the like.

The technical solution of the present disclosure and how to solve the above technical problems by the technical solution of the present disclosure will be described in detail with specific examples hereinafter. It should be noted that the following specific embodiments can be combined with each other, and the same or similar concepts or processes may not be described in detail in some embodiments. Embodiments of the present disclosure will be described with reference to the accompanying drawings hereinafter.

Figure 1B:
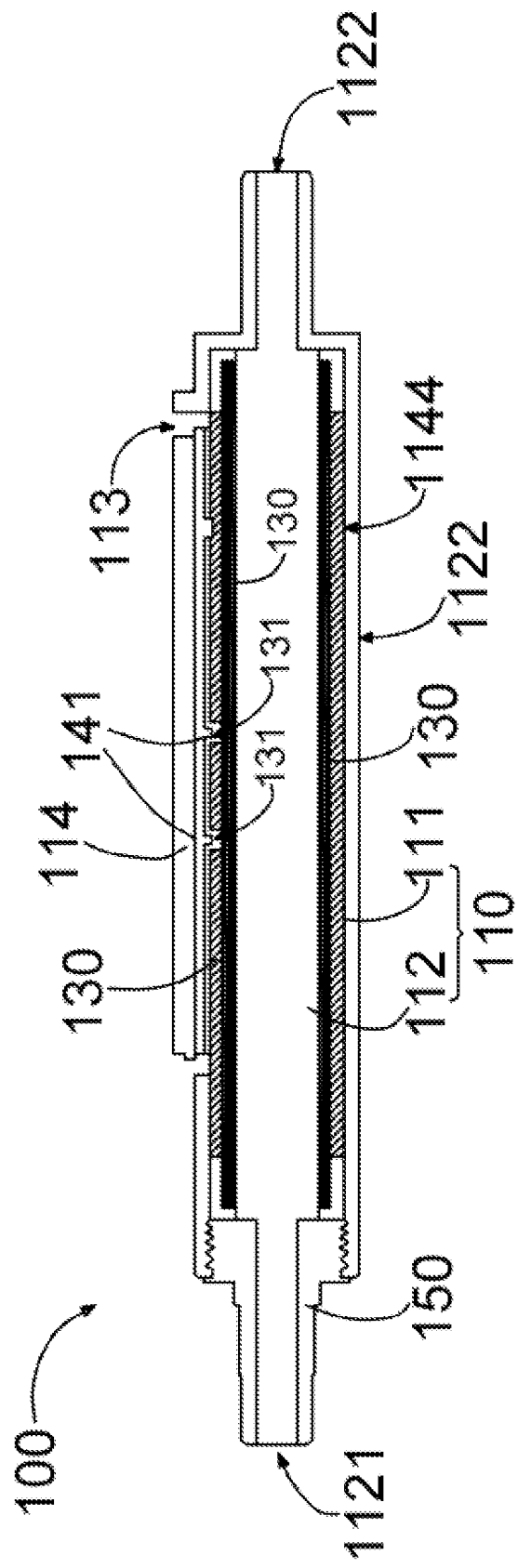
FIG. 1B is a cross-sectional view of an ultraviolet sterilization device according to an embodiment of the present disclosure.
Figure 1D:
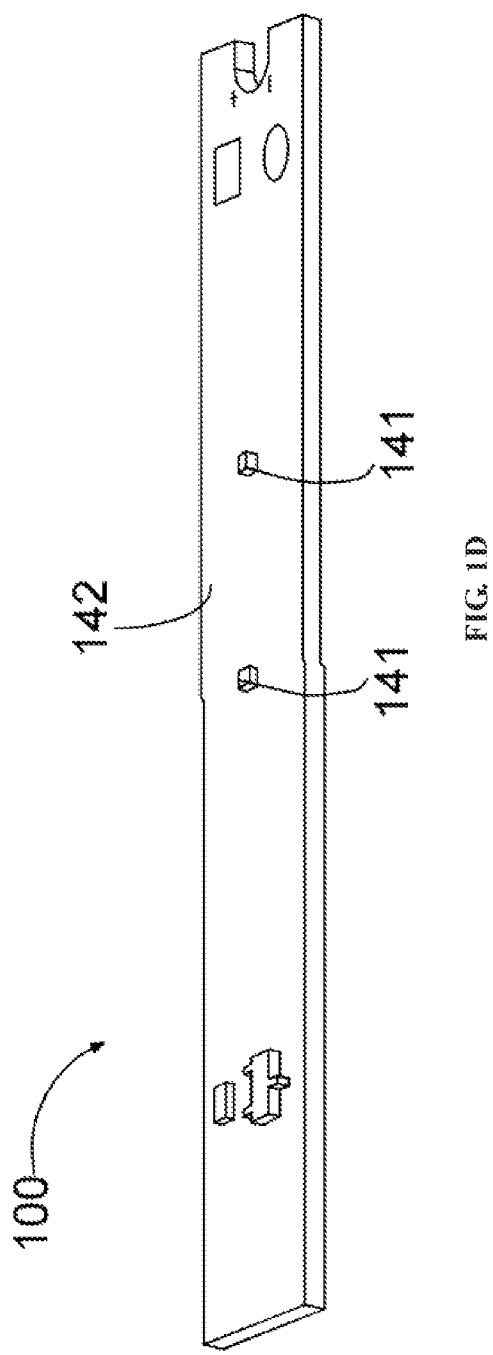
FIG. 1D is a schematic structural diagram of an ultraviolet light source of an ultraviolet sterilization device according to an embodiment of the present disclosure.
Figure 1F:
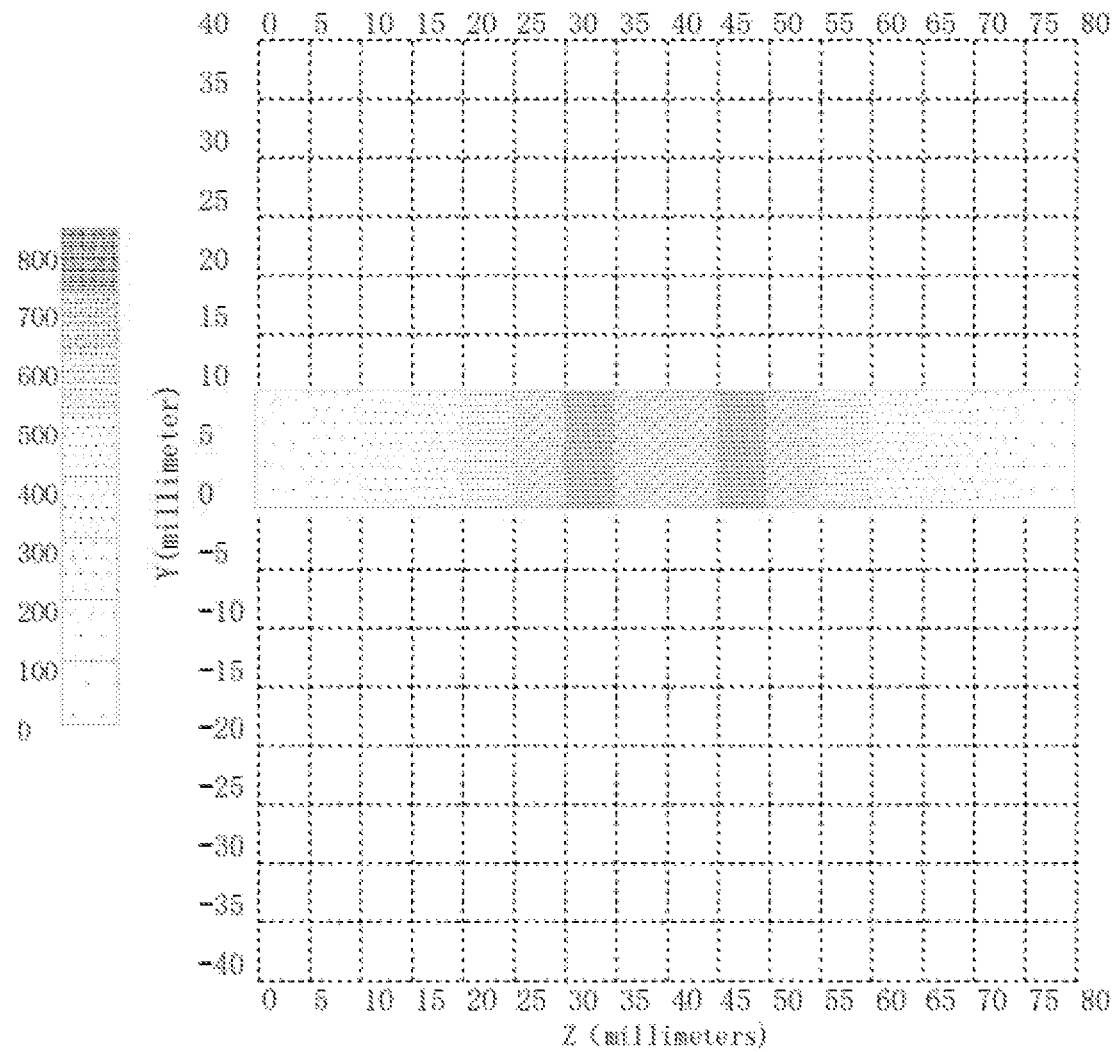
FIG. 1F is a schematic diagram of illuminance distribution of an ultraviolet light source in a pipe of an ultraviolet sterilization device according to an embodiment of the present disclosure.
Figure 2A:
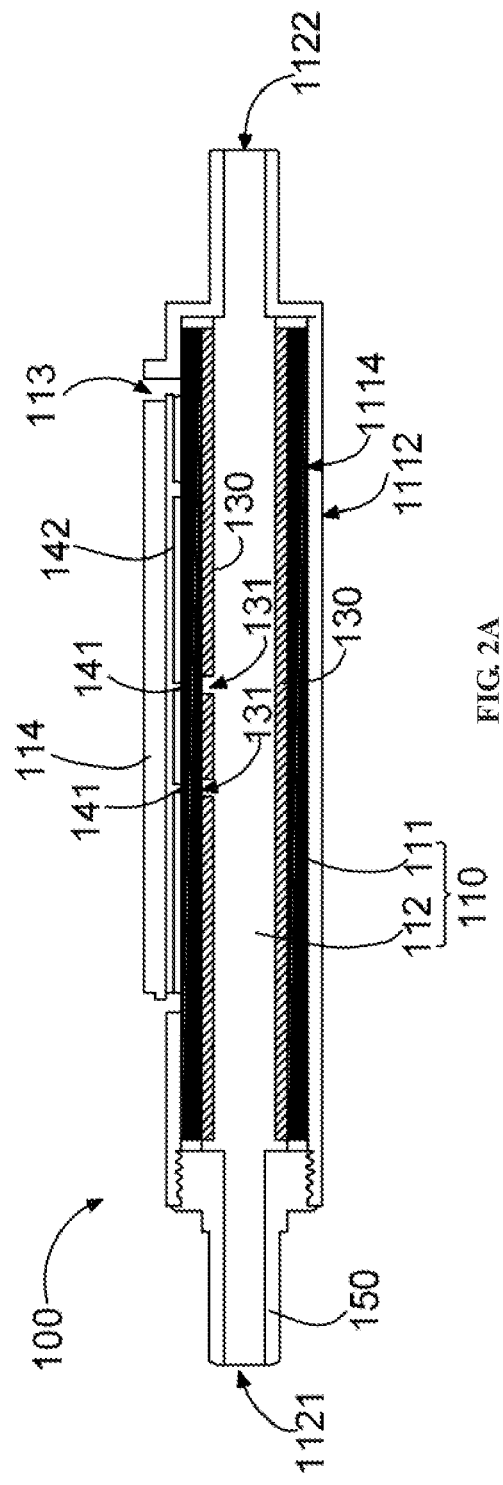
FIG. 2A is a cross-sectional view of another ultraviolet sterilization device according to an embodiment of the present disclosure.
Figure 2B:
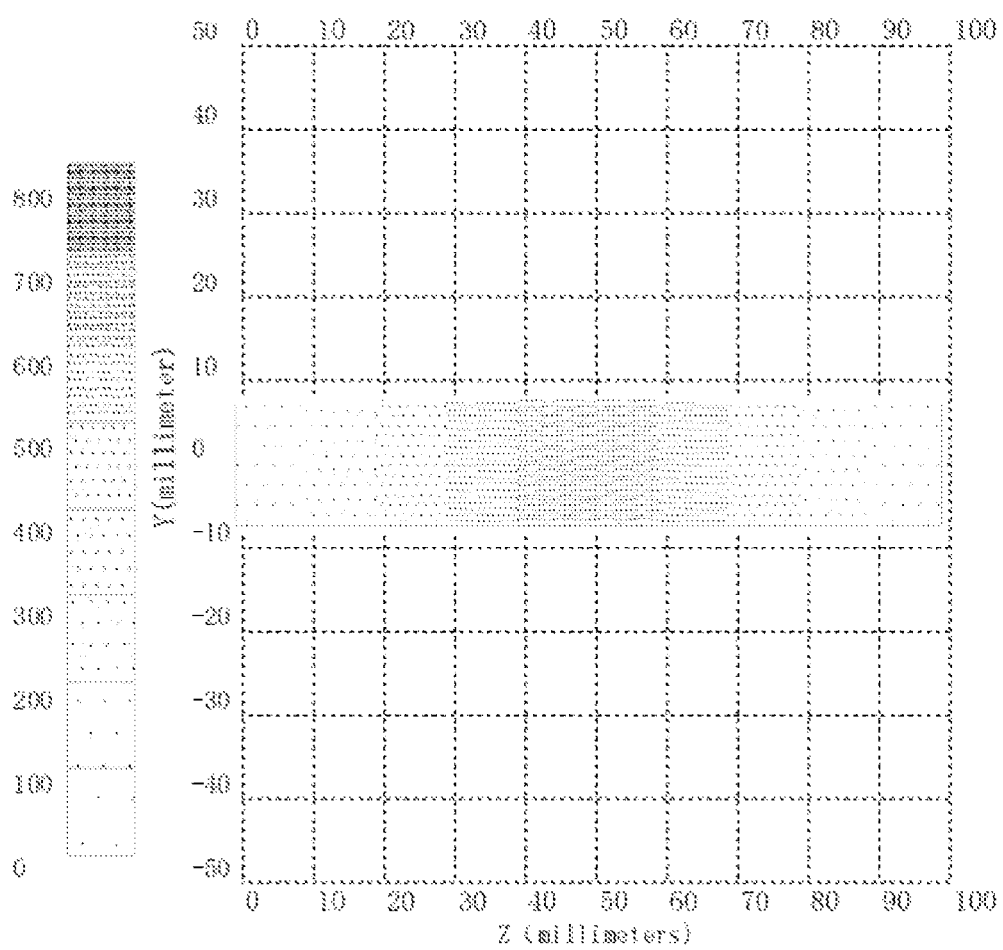
FIG. 2B is a schematic diagram of illuminance distribution of an ultraviolet light source in a pipe of another ultraviolet sterilization device according to an embodiment of the present disclosure.
Figure 3A:
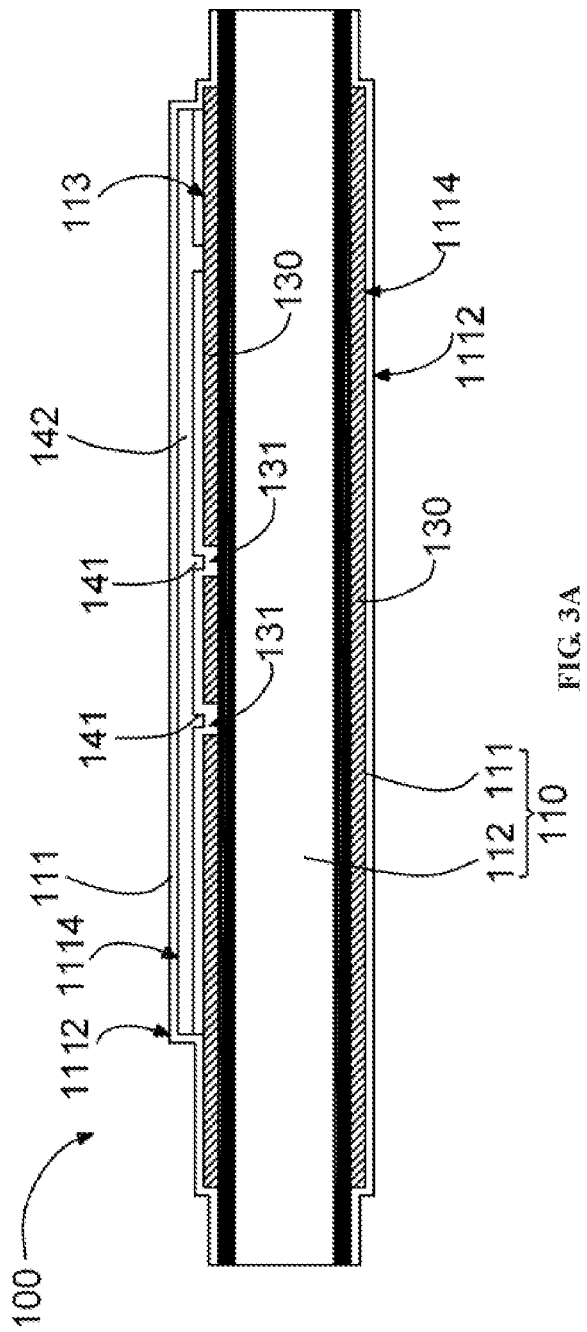
FIG. 3A is a cross-sectional view of another ultraviolet sterilization device according to an embodiment of the present disclosure.
Figure 3B:
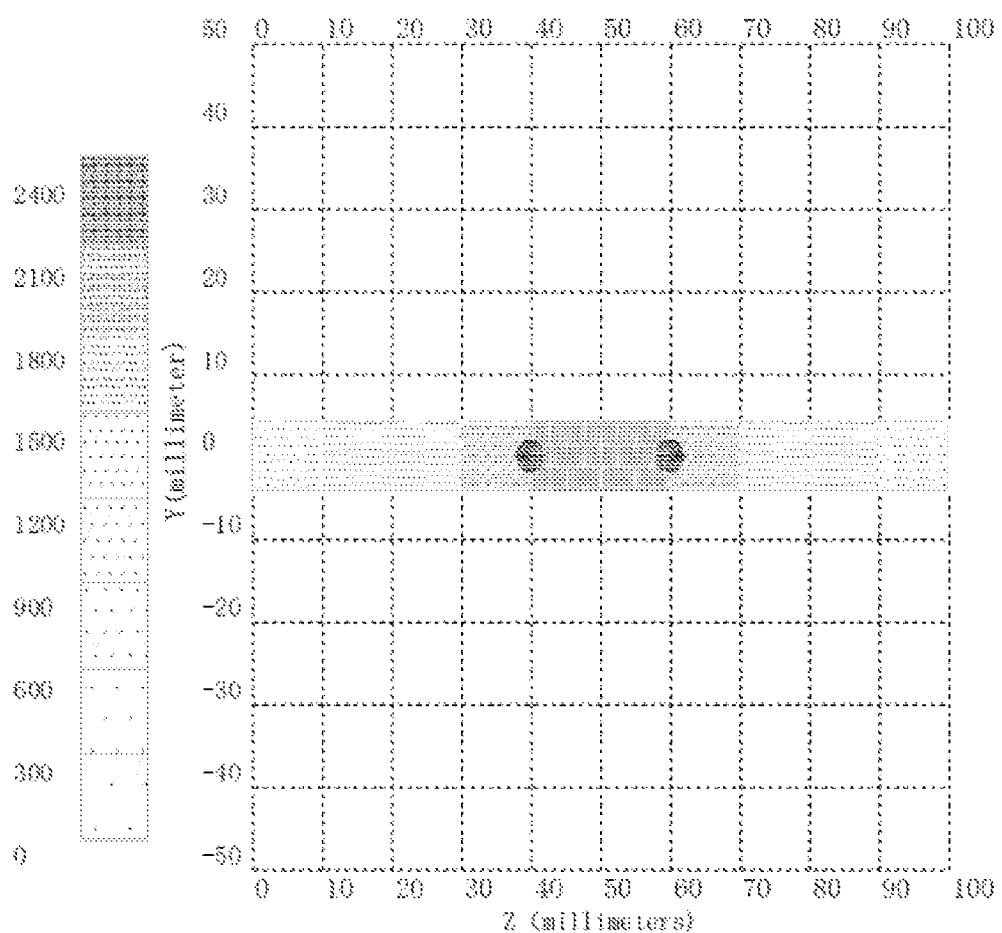
FIG. 3B is a schematic diagram of illuminance distribution of another ultraviolet sterilization device according to an embodiment of the present disclosure.

FIG. 1A is an exploded view of an ultraviolet sterilization device according to an embodiment of the present disclosure. FIG. 1B is a cross-sectional view of an ultraviolet sterilization device according to an embodiment of the present disclosure. FIG. 1C is a schematic structural diagram of a hollow pipe of an ultraviolet sterilization device according to an embodiment of the present disclosure. FIG. 1D is a schematic structural diagram of an ultraviolet light source of an ultraviolet sterilization device according to an embodiment of the present disclosure. FIG. 1E is a schematic structural diagram of a shell of an ultraviolet sterilization device according to an embodiment of the present disclosure. FIG. 1F is a schematic diagram of illuminance distribution of an ultraviolet light source in a pipe of an ultraviolet sterilization device according to an embodiment of the present disclosure. FIG. 2A is a cross-sectional view of another ultraviolet sterilization device according to an embodiment of the present disclosure. FIG. 2B is a schematic diagram of illuminance distribution of an ultraviolet light source in a pipe of another ultraviolet sterilization device according to an embodiment of the present disclosure. FIG. 3A is a cross-sectional view of another ultraviolet sterilization device according to an embodiment of the present disclosure. FIG. 3B is a schematic diagram of illuminance distribution of another ultraviolet sterilization device according to an embodiment of the present disclosure.

The present disclosure provides an ultraviolet sterilization device 100, as shown in FIGS. 1A-1E, which includes a liquid passing pipe assembly 110 and an ultraviolet light source 140. The liquid passing pipe assembly 110 includes a shell 111 and a transparent hollow pipe 112, the shell 111 is sleeved on the hollow pipe 112, the shell 111 is provided with an accommodating groove 113, and the ultraviolet light source 140 is provided in the accommodating groove 113. One end of the hollow pipe 112 is provided as a liquid inlet end 1121, and the other end thereof is provided as a liquid outlet end 1122, and the hollow pipe 112 is used for circulating liquid. The wall surface of the hollow pipe 112 is covered with a reflective film 130, the reflective film 130 is provided with first light transmitting holes 131 at the position corresponding to the ultraviolet light source 140, the first light transmitting holes 131 are communicated with the accommodating groove 113, so that the ultraviolet light emitted by the ultraviolet light source 140 is incident into the hollow pipe 112 and sterilizes the liquid circulating in the hollow pipe 112, and the reflective film 130 is used for scattering the ultraviolet light in different areas in the hollow pipe 112.

It should be noted that the ultraviolet light source 140 is provided in the accommodating groove 113 provided on the shell 111. The transparent hollow pipe 112 is used for the liquid to be sterilized to flow. The wall of the hollow pipe 112 is covered with the reflective film 130. Ultraviolet light enters the hollow pipe 112 and irradiates on the wall surface of the hollow pipe 112, and the light ray is reflected by the reflective film 130 covered on the wall surface. Under the action of the reflective film 130, ultraviolet rays are scattered to various areas in the hollow pipe 112, such as the vicinity of the liquid inlet end 1121, the middle area of the hollow pipe 112 and the vicinity of the liquid outlet end 1122, so as to sterilize the water in various areas in the hollow pipe 112 and obtain a good sterilization effect, Since the reflective film 130 is an opaque or partially transparent film layer, it is necessary to provide the first light transmitting holes 131 in the reflective film 130 so that the ultraviolet light emitted by the ultraviolet light source 140 can enter the hollow pipe 112 through the first light transmitting holes 131.

In this embodiment, the reflective film 130 is covered on the hollow pipe 112, and the ultraviolet light source 140 is scattered to different areas in the hollow pipe 112, so as to realize the sterilization and disinfection function of the liquid flowing through the hollow pipe 112. The device is simple in structure and low in cost, and can be widely applied to scenes such as household water dispensers, faucets, pet water dispensers, humidifiers, smart toilets and the like.

In a possible embodiment, there are two groups of ultraviolet light sources 140, and the two groups of ultraviolet light sources 140 are provided on the side walls of the opposite sides of the shell 111, respectively.

It can be understood that if the ultraviolet light source 140 is only provided at one side of the shell 111, although the ultraviolet rays are scattered by the reflective film 130, the illumination (i.e., the illumination intensity) of the ultraviolet light on the side walls of the opposite sides of the hollow pipe 112 may not be uniform enough, and the illumination on the side where the ultraviolet light source 140 is provided is stronger, which will lead to the uneven sterilization degree of each area of the flowing liquid. Therefore, one group of ultraviolet light sources 140 is provided on each of the side walls of the opposite sides of the shell 111, respectively. On the one hand, the illumination of ultraviolet light can be improved, and on the other hand, the uniformity of the illumination of ultraviolet light on the side walls of the opposite sides of the hollow pipe 112 can be ensured, thereby ensuring the consistency of sterilization degree of all areas of the water.

In an alternative embodiment, as shown in FIGS. 1B and 1D, the ultraviolet light source 140 includes LED lamps 141, and LED lamps 141 in each group of ultraviolet light sources 140 include one or two LED lamps.

The ultraviolet light source 140 is formed by welding an LED lamp 141 capable of emitting ultraviolet light on a ceramic or metal substrate 142. A circuit is preset on the ceramic or metal substrate 142. The circuit is used to control turning on or off the LED lamp 141.

It should be noted that there may be a single LED lamp or a plurality of LED lamps 141, but because the reflective film 130 is opaque or not completely transparent, in order to make the ultraviolet light emitted by the ultraviolet light source 140 enter the hollow pipe 112 through the reflective film 130, it is necessary to provide the first light transmitting holes 131 on the reflective film 130. It can be understood that the larger the number of LED lamps 141 is, the larger the area of the first light transmitting holes 131 is and the more incomplete the reflective film 130. Moreover, because there is more than one group of ultraviolet light sources 140, the area of the first light transmitting holes 131 is larger. The incompleteness of the reflective film 130 will affect its reflection effect on ultraviolet light. In order to protect the integrity of the reflective film 130, it is necessary to limit the number of LED lamps 141 of each group of ultraviolet light sources 140, and then control the number and area of the first light transmitting holes 131.

In this embodiment, by limiting the number of LED lamps 141, under the condition of meeting the irradiation intensity of ultraviolet light, the area of the first light transmitting hole 131 is reduced as much as possible, so as to ensure the integrity of the reflective film 130, thereby ensuring the better reflection effect of the reflective film 130 on light.

In some embodiments, as shown in FIG. 1B, the LED lamps 141 are correspondingly provided in the middle of the hollow pipe 112.

It should be noted that the LED lamp 141 can be provided at any position of the circumferential outer side of the hollow pipe 112. However, when the LED lamp is provided in the middle of the hollow pipe 112, the ultraviolet light emitted by the LED lamp 141 can be uniformly distributed on both sides of the hollow pipe 112 under the action of the reflective film 130. It can be understood that the LED lamp 141 directly irradiates the middle of the hollow pipe 112. Therefore, the intensity of ultraviolet light is the strongest. The ultraviolet light at both ends of the hollow pipe 112 is obtained by reflecting the ultraviolet light in the middle of the hollow pipe 112 through the reflective film 130, so that the intensity of ultraviolet light at both ends of the hollow pipe 112 is weak. However, in this arrangement mode, because the distance between each area of the areas at both ends of the hollow pipe 112 and the middle area is the same and not far away, the intensity of ultraviolet light on both sides symmetrical along the middle of the hollow pipe 112 is basically the same, and the intensity of ultraviolet light in the areas at both ends is not too weak. The areas at both ends also have certain sterilization ability. When the liquid flows into the hollow pipe 112 from the liquid inlet end 1121, the ultraviolet light at the liquid inlet end 1121 first preliminarily sterilizes the liquid. When the liquid flows into the middle area of the hollow pipe 112, because of the strong intensity of ultraviolet light here, the liquid can be thoroughly sterilized. When the liquid flows to the liquid outlet end 1122 through the middle area of the hollow tube 112, the ultraviolet light at the liquid outlet end 1122 can further sterilize the liquid. In this way, in the whole process of liquid flowing through the hollow pipe 112, the liquid is sterilized by ultraviolet light with a certain intensity, thus ensuring that the ultraviolet sterilization device 100 has a good sterilization effect.

On the other hand, the LED lamp 141 is correspondingly provided in the middle of the hollow pipe 112, so that the LED lamp 141 is as far away from the liquid inlet end 1121 and the liquid outlet end 1122 as possible, which can prevent ultraviolet light from being reflected to the outside of the hollow pipe 112 as much as possible, thereby avoiding the lost energy of ultraviolet light, and the harm caused by ultraviolet light leakage.

In addition, in order to prevent ultraviolet light from being emitted from both ends of the hollow pipe 112 to the outside of the hollow pipe 112, it is not necessary to provide reflective films 130 in the areas near the liquid inlet end 1121 and the liquid outlet end 1122 of the hollow pipe 112, so that the ultraviolet light cannot be reflected at the ends of the hollow pipe 112, thereby further ensuring that the ultraviolet light remains in the ultraviolet sterilization device 100 without leakage.

In some embodiments, the radial size of the LED lamp 141 is less than or equal to 5 mm.

The radial size of the LED lamp 141 should be selected according to the demand for the power of the LED lamp 141. Generally speaking, the larger the power of the LED lamp 141 is, the larger the size is, and the stronger the intensity of ultraviolet light is. However, in this embodiment, since the radial size of the LED lamp 141 will affect the size of the first light transmitting hole 131 provided in the reflective film 130, the larger the radial size of the LED lamp 141 is, the larger the first light transmitting hole 131 is. In order to ensure the integrity of the reflective film as much as possible, the radial size of the LED lamp 141 needs to be selected in an appropriate range. In this embodiment, according to the application scenario of the ultraviolet sterilization device 100 provided by the present disclosure, the radial size of the LED lamp 141 can be selected to be less than or equal to 5 mm to meet the demand. For example, the size of the LED lamp 141 can be a lamp bead with a size of ≤5 m×5 mm, and a smaller lamp bead with a size of ≤3.5 mm×3.5 mm can be selected.

Accordingly, the radial size of the first light transmitting hole 131 is greater than or equal to one time the size of the LED lamp 141 in the radial direction and less than or equal to three times the size of the LED lamp 141 in the radial direction.

It can be understood that the radial size of the first light transmitting hole 131 is not less than the size of the LED lamp 141 in the radial direction, so as to ensure that all the ultraviolet light emitted by the LED lamp 141 passes through the first light transmitting hole 131 and irradiates into the hollow pipe 112, thus making full use of the light energy of the ultraviolet light. The radial size of the first light transmitting hole 131 is less than or equal to three times the size of the LED lamp 141 in the radial direction. For example, the radial size of the first light transmitting hole 131 can be set to twice the size of the LED lamp 141 in the radial direction, so as to maintain the integrity of the reflective film 130 while ensuring that the ultraviolet light passes through the first light transmitting hole 131 as much as possible.

As for the specific arrangement position and arrangement mode of the ultraviolet light source 140, generally, the ultraviolet light source 140 is provided in the accommodating groove 113 of the shell.

In one embodiment, as shown in FIGS. 1A-1B, the accommodating groove 113 is provided on the outer wall surface 1112 of the shell 111. The opening of the accommodating groove 113 is away from the hollow pipe 112. The bottom of the accommodating groove 113 is provided with a second light transmitting hole 1131 at the position corresponding to the first light transmitting hole 131. The second light transmitting hole 1131 is communicated with the first light transmitting hole 131, so that the ultraviolet light emitted by the ultraviolet light source 140 is incident into hollow pipe 112 after passing through the second light transmitting hole 1131 and the first light transmitting hole 131. For the specific arrangement mode of the second light transmitting holes 1131, for example, the second light transmitting holes 1131 are provided at the bottom of the accommodating groove 113 at, the position corresponding to the LED lamps 141 of the ultraviolet light source 140. The number of the second light transmitting holes 1131 is the same as that of the LED lamps 141, and a plurality of second light transmitting holes 1131 are provided at intervals. The purpose of this arrangement is to ensure the integrity of the shell 111 as much as possible. Of course, an integral second light transmitting hole 1131 can also be directly provided at the bottom of the accommodating groove 113, so that the ultraviolet light emitted by each LED lamp 141 can pass through the second light transmitting hole 1131, which is not particularly limited here.

In some embodiments, as shown in FIG. 1A, FIG. 1B and FIG. 2A, an upper cover 114 is provided at the opening of the accommodating groove 113, and the upper cover 114 is used for protecting the ultraviolet light source 140.

In another embodiment, as shown in FIG. 3A, the accommodating groove 113 is provided on the inner wall surface 1114 of the shell 111, the opening of the accommodating groove 113 faces the hollow pipe 112, and the ultraviolet light emitted by the ultraviolet light source 140 is incident into the hollow pipe 112 through the first light transmitting hole 131. At this time, because the accommodating groove 113 is provided inside the shell 111, and the opening of the accommodating groove 113 faces the hollow pipe 112, the accommodating groove 113 does not need to be provided with the second light transmitting hole 1131. The ultraviolet light can directly enter the first light transmitting hole 131 through the opening of the accommodating groove 113, and then be incident into the hollow pipe 112 from the first light transmitting hole 131. It can be understood that this arrangement mode makes the ultraviolet light source 140 closer to the hollow pipe 112, and the liquid circulating in the hollow pipe 112 can play a good cooling role to keep the excellent performance of the ultraviolet light source 140.

In an alternative embodiment, the wavelength range of ultraviolet light emitted by the LED lamp 141 is 240-340 nm, Ultraviolet light in this wavelength range is referred to as deep ultraviolet light. Because bacteria have wavelength selectivity, ultraviolet light in this wavelength range generally has a better sterilization effect. Therefore, selecting the ultraviolet light source 140 in this wavelength range can effectively improve the sterilization effect of the ultraviolet sterilization device 100.

Accordingly, the reflective film 130 is made of any one of inorganic material coating with diffuse reflectivity higher than 95%, fluorine-based organic material film with diffuse reflectivity higher than 95% or reflective medium film with specular reflectivity higher than 98%. Specifically, from the view of difficulty and cost of the process, the expanded polytetrafluoroethylene film with diffuse reflectivity higher than 95% is generally selected, which is relatively cheap and easy to process. However, if a better sterilization ability and a smaller size are required, the dielectric film of a distributed Bragg reflector with specular reflectivity greater than 99% can be selected.

For example, as shown in FIGS. 1B and 2A, the reflective film 130 is provided on the outer wall surface 1112 of the hollow pipe 112. In fact, the reflective film 130 can also be provided on the inner wall surface 1114 of the hollow pipe 112. However, in actual process, since it is difficult to provide the reflective film 130 on the inner wall surface 1114 of the hollow pipe 112, and the liquid flowing in the hollow pipe 112 may chemically react with the reflective film 130, the reflective film 130 can generally be provided on the outer wall surface 1112 of the hollow pipe 112.

In order to prevent ultraviolet rays from escaping from the liquid inlet end 1121 or the liquid outlet end 1122 of the hollow pipe, the length of the hollow pipe 112 generally ranges from 40 mm to 100 mm. The inner diameter of the hollow pipe 112 ranges from 4 mm to 20 mm. The light emitting angle of the LED lamp 141 is less than or equal to 140 degrees. It can be understood that the length of the hollow pipe 112, the inner diameter of the hollow pipe 112 and the light emitting angle of the lamp 141 should be selected based on comprehensive consideration, so as to prevent the ultraviolet light emitted by the LED lamp 141 from escaping as much as possible, thereby making full use of the energy of the LED lamp 141 to sterilize the liquid flowing through the hollow pipe 112.

It should be noted that the length of the hollow pipe 112 can be 40 mm to 100 mm according to the light emitting angle of the LED light source and the reflectivity of the reflective film 130. When the length of the hollow pipe 112 is below 40 mm, although the sterilization device for flowing water can be made smaller, the cumulative ultraviolet dose when the water flows through the hollow straight pipe is low, which will affect the sterilization rate. When the length of the hollow pipe 112 is above 100 mm, the size of the sterilization device for flowing water will also be significantly increased, but the cumulative ultraviolet dose does not significantly increase, which does not improve the sterilization effect obviously.

In addition, when the inner diameter of the hollow pipe 112 is larger than 10 mm, because the ultraviolet light will easily escape from both sides of the hollow pipe 112 due to the long path of each reflection of the ultraviolet light, it is possible to consider selecting the LED lamp 141 with a small light emitting angle. For example, the LED lamp 141 with a light emitting angle less than 90 degrees is selected, so as to restrict excessive ultraviolet light from escaping from both ends of the hollow pipe 112. On the contrary, when the diameter of the hollow pipe 112 is smaller than 10 mm, the path of each reflection of ultraviolet light is short, and it is not easy for ultraviolet light to escape from both ends of the hollow pipe 112. Therefore, the LED lamp 141 with a large light emitting angle can be selected. For example, the LED lamp 141 with a light emitting angle greater than 90 degrees can be selected to ensure that the energy of ultraviolet light can be fully utilized, so as to obtain ultraviolet light irradiation with higher intensity when the liquid flows through the hollow pipe 112.

In addition, it should be noted that the ultraviolet light source 140 can also be provided at both ends of the hollow pipe 112, that is, the liquid inlet end or the liquid outlet end. However, since there is liquid flowing through both ends, it is necessary to provide a waterproof structure to separate the ultraviolet light source 140 from the liquid. At this time, if the inner diameter of the hollow pipe 112 is relatively small, the space at the end of the hollow pipe is relatively small, so that it is generally difficult to provide the ultraviolet light source 140 at the end. When the inner diameter of the hollow pipe 112 is relatively large, the ultraviolet light source 140 can be provided at the end of the hollow pipe because the space at the end of the hollow pipe 112 is relatively large at this time. When the inner diameter is large, it is generally required to process liquid with a large flow rate, and the power of the ultraviolet light source 140 used at this time is relatively high. However, when the ultraviolet light source 140 is provided at the end, the liquid circulating in the hollow pipe 112 cannot cool the ultraviolet light source 140, so that it is necessary to additionally provide a heat dissipation base to dissipate heat from the ultraviolet light source 140, thus obtaining better optical characteristics. The smaller the inner diameter is, the more delicate the ultraviolet sterilization device 100 can be, but the corresponding flow rate that can be processed is also smaller. Generally, considering the sterilization ability and space requirements of the ultraviolet sterilization device 100 in practical application scenarios, the inner diameter range of the hollow pipe 112 can be set to 6 mm to 15 mm.

The ultraviolet sterilization device 100 provided in this embodiment has certain advantages in sterilizing flowing water with a small flow rate of 2 L/min or less because of its small size.

In some embodiments, the hollow pipe 112 is made of any one of quartz, alumina or fluorine-based organic ultraviolet transparent material. It can be understood that in order to make the light of the ultraviolet light source 140 incident into the hollow pipe 112 to sterilize the water body flowing in the hollow pipe 112, the hollow pipe 112 should be made of transparent materials, and all the above materials can be used to make the transparent hollow pipe 112. Because the process of manufacturing the hollow pipe 112 of quartz is more mature and the cost is lower, a quartz hollow pipe 112 can generally be used.

In order to facilitate the connection of the hollow pipe 112 to a liquid source, such as a faucet, the liquid inlet end 1121 of the hollow pipe 112 is provided with a detachable joint 150. As shown in FIGS. 1A, 1B and 2A, the end of the joint 150 is provided with an external thread, the end of the shell 111 corresponding to the liquid inlet end 1121 is correspondingly provided with an internal thread, and the end of the joint 150 is screwed and fixed to the shell 111. With this arrangement, it is convenient to replace the joint 150 according to the model of the liquid source, so that the ultraviolet sterilization device 100 provided by the present disclosure can be used more flexibly and is suitable for a wider range of application scenarios.

In addition, in order to facilitate the manufacturing of the shell 111, the shell 111 can be made of heat shrinkable material. The heat shrinkable material has a memory function and covers the outer surface of the hollow pipe 112 after being heated and shrunk, and can play the roles of insulation, moisture protection, sealing and protection. Especially when the accommodating groove 113 is provided on the inner wall surface 1114 of the shell 111, the ultraviolet light source 140 is provided between the hollow pipe 112 and the shell 111, and with the heat shrinkable material, it is easier to fix the ultraviolet light source 140, In addition, the shell 111 can also be made of other metals, plastics and other materials, and it is generally considered to select materials that are not easy to yellow under irradiation of ultraviolet light.

Therefore, the ultraviolet sterilization device 100 provided by the present disclosure is modulated, with the selected length and inner diameter of the hollow pipe 112, by the light emitting angle of the ultraviolet light source 140 and the reflectivity of the reflective film 130. The ultraviolet light emitted by the ultraviolet light source 140 is irradiated into the hollow pipe 112 through the first light transmitting hole 131 on the reflective film 130, and is reflected by the reflective film 130 for many times, so that the illuminance of the ultraviolet light in the hollow pipe 112 is greatly enhanced, and in the straight pipe the illuminance in the middle is high and the illuminance at both ends is low. At this time, the area with the strongest ultraviolet illumination is concentrated in the center of the hollow pipe 112, and the illumination at both ends of the hollow pipe 112 is relatively weak. It can be understood that after the ultraviolet light is reflected by the reflective film 130, the superposition of the ultraviolet light may occur, thus enhancing the illumination of the ultraviolet light in the hollow pipe 112 to a certain extent.

The specific size of the ultraviolet sterilization device 100 provided by the present disclosure will be illustrated by three specific examples hereinafter.

In a first example, as shown in FIGS. 1A-1E, the hollow pipe 112 of the ultraviolet sterilization device 100 is made of quartz. The quartz pipe has a length of 80 mm, an inner diameter of 8 mm, and a wall thickness of 1 mm. The reflective film 130 is an expanded polytetrafluoroethylene film with diffuse reflectivity of 95% in the ultraviolet wavelength range of 250-350 nm. The film thickness of the reflective film 130 is 0.5 mm, and the reflective film 130 is provided with first light transmitting holes 131 with a size of 1 mm×1 mm. The ultraviolet light source 140 contains two LED lamps 141. The distance between two LED lamps 141 is 10 mm, the bead size of the LED lamp 141 is 0.5 mm×0.5 mm, the radiation power of the LED lamp 141 is 15 mW, and the light emitting angle is 140 degrees. The substrate 142 is an aluminum substrate 142. The outer shell 111 uses a plastic injection molding process to fix and protect the inner structure.

It should be noted that another function of the reflective film 130 is to fill the gap between the shell 111 and the hollow pipe 112, so that the thickness of the reflective film 130 can be selected according to the actual structural requirements.

The distribution of ultraviolet illumination in the hollow pipe 112 of the ultraviolet sterilization device 100 provided in this example is analyzed hereinafter, and the actual sterilization test is carried out on the manufactured sample.

As shown in FIG. 1F, it can be seen from the figure that the area with the strongest ultraviolet illuminance is in the middle of the quartz pipe. The illuminance at this position reaches about 100 mW/cm² (the two dark areas in the middle of the figure correspond to two LED lamps), and the illuminance decreases gradually towards both ends, and drops to about 5 mW/cm² within the range of 1 cm from each end of the quartz pipe. Considering that the sterilization effect is the accumulation effect of illumination and time, the average illumination in the quartz pipe can be used as one of the important performance indexes to measure the sterilization ability. The average illuminance in the quartz pipe of this embodiment is about 35.6 mW/cm². It should be noted that, compared with the numerical values shown in FIG. 1F, the above illuminance values need to be converted into units.

In order to show the actual sterilization effect, the actual sterilization rate of the ultraviolet sterilization device 100 provided in this example is tested. This sterilization rate test is to use *Escherichia coli* 8099 solution with a concentration of 4.5×10⁴ cfu/ml (the unit of the number of colonies is cfu/ml). The solution flows in from the liquid inlet end 1121 of the quartz pipe at a flow rate of 1 L/min, and then flows out from the liquid outlet end 1122 of the quartz pipe after sterilization in the cavity. In addition, the *Escherichia coli* 8099 solution which does not flow through the sterilization device is taken as the positive control solution, 100 uL of sterilized solution (i.e. experimental samples) and 100 ul of positive control solution are taken and are put into a constant temperature incubator at 37 □ for culture after being smeared uniformly on the surface of eosin methylene blue agar. After 24 to 48 hours, the number of colonies of sterilized solution and positive control solution samples are observed and calculated. The sterilization rate can be calculated in at least two ways:

sterilization rate=(number of colonies of positive control−number of colonies of experimental samples)/number of colonies of positive control×100%; (1)

It is expressed by Logarithm Reduction Value (LRV), and the calculation formula is: LRV=− log (number of colonies of experimental samples/number of colonies of positive control). (2)

After the experiment, the results are as follows (the unit of number of colonies is cfu/ml):

The number of colonies of the positive control solution is 4.5×10⁴, while the number of colonies of the sterilized solution is 5, According to the above first formula, the sterilization rate can reach 99.99%. According to the above first formula, the LRV value can reach 4.

According to the above sterilization experiment data, it can be seen that the ultraviolet sterilization device 100 provided by this example can effectively sterilize the flowing water of 1 L/min.

In the second example, as shown in FIG. 2A, the hollow pipe 112 of the ultraviolet sterilization device 100 is made of quartz. The quartz pipe has a length of 10 mm, an inner diameter of 16.5 mm, and a wall thickness of 2.5 m. The reflective film 130 is an expanded polytetrafluoroethylene film with diffuse reflectivity of 95% in the ultraviolet wavelength range of 250-350 nm. The film thickness of the reflective film 130 is 0.5 mm, and the reflective film 130 is provided with first light transmitting holes 131 with a size of 2 mm×2 mm. The ultraviolet light source 140 contains two LED lamps 141. The bead size of the LED lamp 141 is 0.7 mm×0.7 mm, the radiation power of the LED lamp 141 is 30 mW, and the light emitting angle is 120 degrees. The substrate 142 is a copper substrate 142. The main body of the shell 111 is made of aviation aluminum, and the joint at both ends of the shell 111 is made of plastic. Considering the thick wall thickness of the quartz pipe in this example, although the reflection of the reflective film 130 can make the whole quartz pipe have higher ultraviolet illumination, because the thickness range of the wall surface of the quartz pipe is not an effective sterilization space, in this embodiment the reflective film 130 preferably is attached to the inner wall of the quartz pipe, so that ultraviolet light can be reflected without passing through the side wall of the quartz pipe, avoiding the consumption of ultraviolet light energy, and thus ensuring a better reflection effect.

As shown in FIG. 2B, it can be seen from the figure that the area with the strongest ultraviolet illumination is in the middle of the quartz pipe, where the illumination reaches about 40 mW/cm², and the illumination decreases gradually towards both ends, and drops to about 3 mW/cm² within the range of 1 cm from each end of the quartz pipe. The average illumination in the quartz pipe is about 12.5/cm². Although compared with the first example, the average illuminance in the cavity is reduced, but the sterilization space in the quartz pipe is increased, that is, the quartz pipe becomes thicker, and the flow rate of the liquid in the quartz pipe will slow down, that is, the irradiation time when the liquid flows into the ultraviolet sterilization device 100 will be increased. Actually, the test is also conducted at a flow rate of 1 L/min, and the irradiation dose (illumination multiplied by time) of water flowing into the ultraviolet sterilization device 100 in this example is nearly twice that of the first example. That is to say, the larger the effective sterilization space is, the longer the corresponding sterilization time is, and the higher the corresponding processing capacity is.

In the third example, as shown in FIG. 3A, the hollow pipe 112 of the ultraviolet sterilization device 100 is made of quartz, and the length of the quartz pipe is 60 mm. The quartz pipe is a square pipe with the inner dimension of 8 mm×8 mm and the wall thickness of 1 mm. The reflective film 130 is formed by evaporating distributed Bragg reflection (DBR) on the outer wall of the quartz pipe by optical coating. The reflective film 130 is formed by alternating 15 pairs of MgO layers and $ZrO_2$ layers, and has a reflectivity of 99% for ultraviolet light in the wavelength range of 250-350 nm. The reflective film 130 is provided with first through holes 131 with a size of 3.5 mm×3.5 mm. The ultraviolet light source 140 contains two LED lamps 141, The bead size of the LED lamp 141 is 3.5 mm×3.5 mm, the radiation power of the LED lamps 141 is 15 mW, and the light emitting angle is 30 degrees. The substrate 142 is an aluminum substrate 142. The main body of the shell 111 is made of heat shrinkable sleeve, and the joint at both ends of the shell 111 is made of plastic.

In this example, DBR is used as the reflective film 130. Although the manufacturing process is relatively complicated, the specular reflectivity of DBR is close to 100%, and higher ultraviolet illumination is obtained inside the quartz pipe. As shown in FIG. 3B, the average illumination inside the quartz pipe reaches about 100 mW/cm², thus obtaining a better sterilization effect.

As the ultraviolet sterilization devices of the second example and the third example have their own advantages compared with the ultraviolet sterilization device 100 of the first example, and have a sterilization effect not lower than that of the first example, the detection experiment of the actual sterilization effect will not be described in detail here.

The present disclosure provides an ultraviolet sterilization device 100, which includes a liquid passing pipe assembly 110 and an ultraviolet light source 140. The liquid passing pipe assembly 110 includes a shell 111 and a transparent hollow pipe 112, the shell 111 is sleeved on the hollow pipe 112. The shell 111 is provided with an accommodating groove 113, and the ultraviolet light source 140 is provided in the accommodating groove 113; one end of the hollow pipe 112 is provided as a liquid inlet end 1121, and the other end thereof is provided as a liquid outlet end 1122. The hollow pipe 112 is used for circulating liquid; the wall surface of the hollow pipe 112 is covered with a reflective film 130, the reflective film 130 is provided with first light transmitting holes 131 at the position corresponding to the ultraviolet light source 140, the first light transmitting hole 131 is communicated with the accommodating groove 113, so that the ultraviolet light emitted by the ultraviolet light source 140 is incident into the hollow pipe 112 and sterilizes the liquid circulating in the hollow pipe 112, and the reflective film 130 is used for scattering the ultraviolet light in different areas in the hollow pipe 112. The ultraviolet sterilization device 100 provided by the present disclosure is simple in structure, low in cost, and suitable for popularization and use in scenes such as household water dispensers, faucets, pet water dispensers, humidifiers, smart toilets and the like.

Finally, it should be noted that the above examples are only used to illustrate the technical solution of the present disclosure, rather than limit the technical solution. Although the present disclosure has been described in detail with reference to the foregoing embodiments, those skilled in the art should understand that it is still possible to modify the technical solutions described in the foregoing embodiments or to replace some or all of the technical features equivalently. However, these modifications or substitutions do not make the essence of the corresponding technical solutions deviate from the scope of the technical solutions of each embodiment of the present disclosure.

What is claimed is:

1. An ultraviolet sterilization device, comprising a liquid passing pipe assembly and an ultraviolet light source, wherein the liquid passing pipe assembly comprises a shell and a transparent hollow pipe, the shell is sleeved on the transparent hollow pipe and provided with an accommodating groove, and the ultraviolet light source is provided in the accommodating groove; a first end of the transparent hollow pipe is configured as a liquid inlet end, and another a second end thereof is configured as a liquid outlet end, and the transparent hollow pipe is configured for circulating liquid; a wall surface of the transparent hollow pipe, except areas near the liquid inlet end and the liquid outlet end of the transparent hollow pipe, is covered with a reflective film, the reflective film is provided with first light transmitting holes at a position corresponding to the ultraviolet light source, the first light transmitting holes are communicated with the accommodating groove, and the reflective film is configured for scattering the ultraviolet light in different areas in the transparent hollow pipe;

wherein the ultraviolet light source comprises two groups of ultraviolet light sources, and the two groups of ultraviolet light sources are provided on side walls of opposite sides of the shell, respectively;

wherein the ultraviolet light source comprises LED lamps, and a number of the LED lamps in each group of ultraviolet light sources is one or two;

wherein the LED lamps are correspondingly provided in a middle of the transparent hollow pipe;

wherein a radial size of each first light transmitting hole is greater than or equal to a size of the LED lamp in the radial direction and less than or equal to three times the size of the LED lamp in the radial direction, wherein the accommodating groove is provided on a circumferential outer wall surface of the shell, an opening of the accommodating groove is away from the transparent hollow pipe, a bottom of the accommodating groove is provided with second light transmitting holes at positions corresponding to the first light transmitting holes, and the second light transmitting holes are communicated with the first light transmitting holes so that ultraviolet light emitted by the ultraviolet light source is incident into the transparent hollow pipe after passing through the second light transmitting holes and the first light transmitting holes, and an upper cover is provided at the opening of the accommodating groove; or the accommodating groove is provided on a circumferential inner wall surface of the shell, an opening of the accommodating groove faces the transparent hollow pipe so that ultraviolet light emitted by the ultraviolet light source is incident into the transparent hollow pipe through the first light transmitting holes.

2. The ultraviolet sterilization device according to claim 1, wherein a radial size of each LED lamp is less than or equal to 5 mm.

3. The ultraviolet sterilization device according to claim 1, wherein a wavelength range of ultraviolet light emitted by the LED lamp is 240-340 nm.

4. The ultraviolet sterilization device according to claim 1, wherein the reflective film is made of any one of inorganic material coating with diffuse reflectivity higher than 95%, fluorine-based organic material film with diffuse reflectivity higher than 95% or reflective medium film with specular reflectivity higher than 98%.

5. The ultraviolet sterilization device according to claim 4, wherein the reflective film is provided on an outer wall surface of the transparent hollow pipe.

6. The ultraviolet sterilization device according to claim 1, wherein a length of the transparent hollow pipe ranges from 40 mm to 100 mm.

7. The ultraviolet sterilization device according to claim 6, wherein an inner diameter of the transparent hollow pipe ranges from 4 mm to 20 mm.

8. The ultraviolet sterilization device according to claim 7, wherein the transparent hollow pipe is made of any one of quartz, alumina or fluorine-based organic ultraviolet transparent material.

9. The ultraviolet sterilization device according to claim 1, wherein a light emitting angle of the LED lamp is less than or equal to 140 degrees.

10. The ultraviolet sterilization device according to claim 1, wherein the liquid inlet end of the transparent hollow pipe is provided with a detachable joint, an end of the joint is provided with an external thread, an end of the shell corresponding to the liquid inlet end is provided with an internal thread, and the end of the joint is screwed and fixed to the shell.

11. The ultraviolet sterilization device according to claim 1, wherein the shell is made of heat shrinkable material.

12. An ultraviolet sterilization device consisting of:
a liquid passing pipe assembly and an ultraviolet light source,
the liquid passing pipe assembly consists of a shell provide with an accommodating groove, a transparent hollow pipe and a reflective film, the shell is sleeved on the transparent hollow pipe, and the ultraviolet light source is provided in the accommodating groove; a first end of the transparent hollow pipe is configured as a liquid inlet end, a second end thereof is configured as a liquid outlet end, and the transparent hollow pipe is configured for circulating liquid; a wall surface of the transparent hollow pipe, except areas near the liquid inlet end and the liquid outlet end of the transparent hollow pipe, is covered with the reflective film, the reflective film is provided with first light transmitting holes at a position corresponding to the ultraviolet light source, the first light transmitting holes are communicated with the accommodating groove, and the reflective film is configured for scattering the ultraviolet light in different areas in the transparent hollow pipe;

the ultraviolet light source comprises two groups of ultraviolet light sources, and the two groups of ultraviolet light sources are provided on side walls of opposite sides of the shell, respectively;

wherein the ultraviolet light source comprises LED lamps, and a number of the LED lamps in each group of ultraviolet light sources is one or two;

wherein the LED lamps are correspondingly provided in a middle of the transparent hollow pipe;

wherein a radial size of each first light transmitting hole is greater than or equal to a size of the LED lamp in the radial direction and less than or equal to three times the size of the LED lamp in the radial direction;

wherein the accommodating groove is provided on a circumferential outer wall surface of the shell, an opening of the accommodating groove is away from the transparent hollow pipe, a bottom of the accommodating groove is provided with second light transmitting holes at positions corresponding to the first light transmitting holes, and the second light transmitting holes are communicated with the first light transmitting holes so that ultraviolet light emitted by the ultraviolet light source is incident into the transparent hollow pipe after passing through the second light transmitting holes and the first light transmitting holes, and an upper cover is provided at the opening of the accommodating groove; or the accommodating groove is provided on a circumferential inner wall surface of the shell, an opening of the accommodating groove faces the transparent hollow pipe so that ultraviolet light emitted by the ultraviolet light source is incident into the transparent hollow pipe through the first light transmitting holes.

\* \* \* \* \*